UNITED STATES PATENT OFFICE.

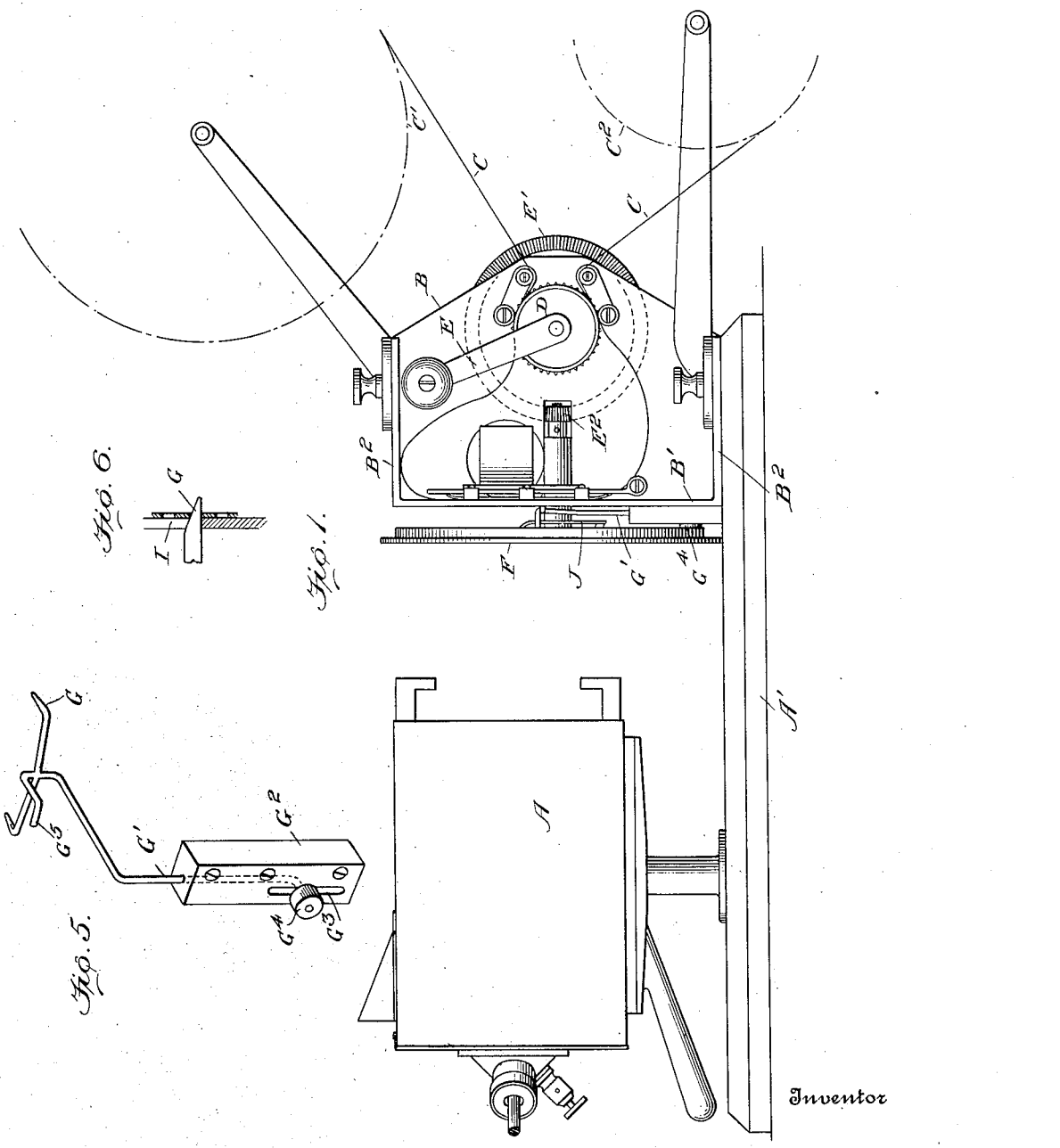

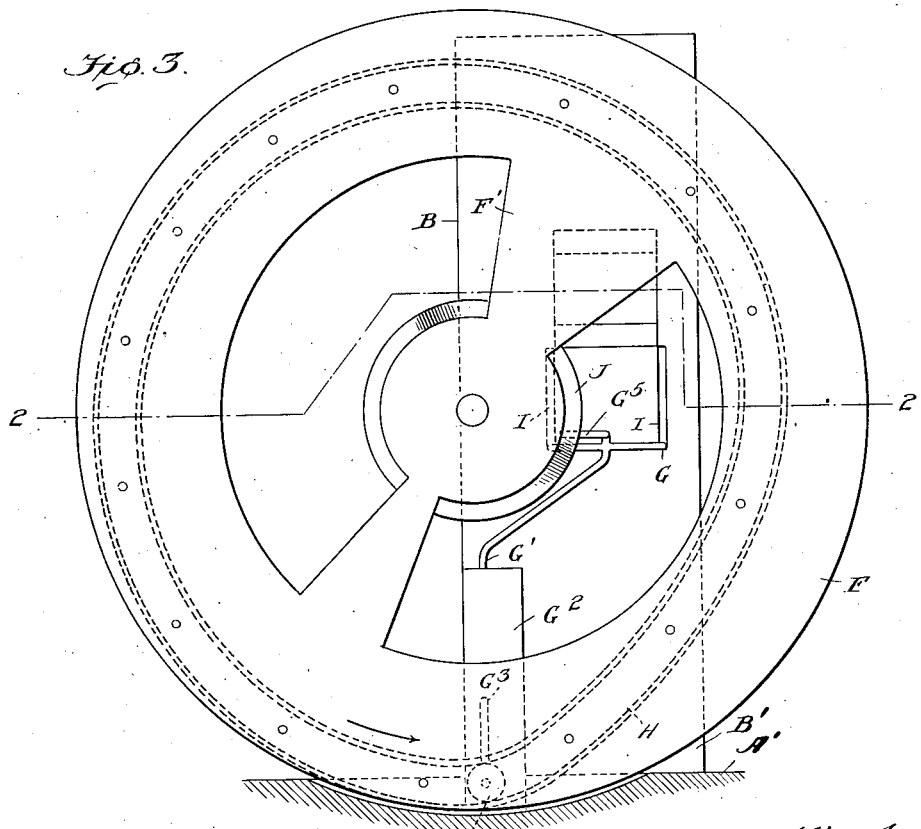
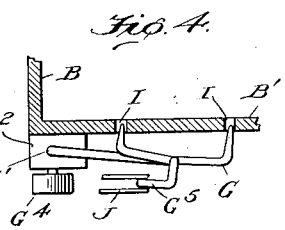
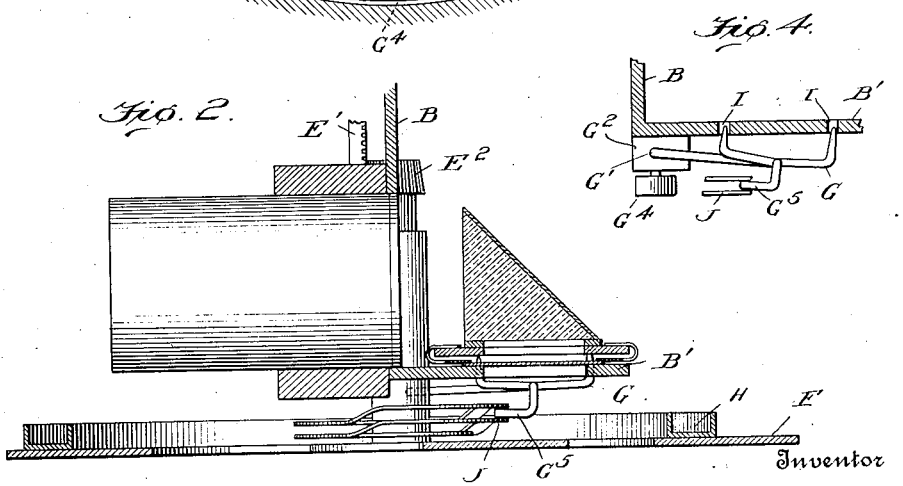

CHARLES FRANCIS JENKINS, OF WASHINGTON, DISTRICT OF COLUMBIA.

MOTION-PICTURE APPARATUS.

1,153,164.  Specification of Letters Patent.  Patented Sept. 7, 1915.

Application filed March 20 1913.  Serial No. 755,753.

*To all whom it may concern:*

Be it known that I, CHARLES FRANCIS JENKINS, a citizen of the United States, residing at Washington, in the District of Columbia, have invented certain new and useful Improvements in Motion-Picture Apparatus, of which the following is a specification, reference being had therein to the accompanying drawing.

This invention relates to motion picture apparatus in which film is advanced step by step, and its principal object is to provide extremely simple means for presenting each picture element precisely in proper position whether or not the apparatus is worn.

In the accompanying drawings, Figure 1 is an elevation of the apparatus. Fig. 2 is a partial section on the line 2—2, Fig. 3. Fig. 3 shows the shutter and adjacent parts looking from the right in Fig. 1. Fig. 4 is a partial section similar to Fig. 2, showing certain parts in a different position. Fig. 5 is a perspective view of a film feeding fork seen in the other figures also. Fig. 6 is a detail of a certain tooth.

In these figures, A represents a box or casing supported, with the rest of the apparatus, upon a base $A'$ and carrying a small arc light, the usual lens, and a rheostat, all without novelty herein claimed. At a suitable distance from the lens is fixed a rigid frame preferably consisting of rigidly connected plane metal webs B, $B'$, $B^2$ at right angles to each other and fixed to the base $A'$ and carrying various members of the apparatus. Film C passes from a roll $C'$ over the upper side of a sprocket drum D, thence along the plate $B'$ over an exposure opening, then back over the lower side of the drum to a roller $C^2$ where it is rewound. The film has slack or a loop above and below the exposure opening and it is frictionally held against the plate $B'$ as usual. The drum is rotated by a crank E, and upon its shaft is secured a gear $E'$ engaging a small pinion $E^2$ upon the shaft of a rotary shutter F which drives the devices for intermittently advancing that portion of the film contiguous to the plate $B'$. The film is provided with perforations in which engage at intervals the wedge-like end portions G of a fork carried by a small spring metal rod $G'$ which slides longitudinally in a bearing $G^2$ nearly below the shutter shaft. The rod extends obliquely upward as seen in Fig. 3 to the fork which it carries, and its lower end is bent outward in a slot $G^3$ in the bearing $G^2$ and provided with a roller $G^4$ which lies in a cam groove H in the lateral face of the shutter F or in a member rigidly secured to the shutter. The cam is such as to cause the rod to rise and descend as the shutter rotates, the descent occurring suddenly and while the light is cut off by a portion $F'$ of the shutter which portion occupies an angular space of about 36°. The teeth of the fork are wedge-like in vertical section and are of such size as to just fill, vertically, the film perforations, and they move up and down in slots I in a fixed plate, striking and being arrested, always at absolutely the same point, in their descent by the lower walls of the slots. Wear does not affect this result for the teeth strike slightly before the cam roller reaches its lowest point, as seen in Fig. 3, the oblique portion of the rod springing slightly to permit this and at the same time cushion the blow of the teeth. As the shutter in standard practice rotates about sixteen times a second, the descent of the fork is extremely rapid, and notwithstanding the slight weight of the small portion of the film moved each time thereby, there is a tendency for it to overrun when thus abruptly stopped, and hence it is important to have the teeth fill the perforations in a vertical direction. The teeth are advanced through the perforations in the film and retracted therefrom at proper times by a relatively small peripherally grooved cam J moving with the shutter and receiving in its groove the end $G^5$ of the rod $G'$ or a projection therefrom, the arrangement being such that this cam moves the fork in and out at suitable times by rocking the whole about the axis of that part of the rod $G'$ in the bearing $G^2$, the motion however, being very slight and allowed by slight springing of the rod.

It is to be observed that the entire rod and fork bear little strain, have very little weight or momentum, and have no abrupt uncushioned change of motion, and therefore may be safely moved with extreme rapidity without injury and without so springing or jarring any parts as to produce "flickering" on the screen. I am therefore able to use a shutter such as to allow light to pass during about nine-tenths of the time, instead of about four-tenths as in standard practice. The practical result is that a relatively feeble non-dangerous light, or light-current, may be used, extending the field of possible use to places where high power lights are not available or not desired, and further greatly lessening the heat upon the film and the usually imminent and unavoidable danger of ignition. All this is accomplished while securing a steadiness of pictures which is unusual, and at the same time eliminating a large part of the usual mechanism as well as all the evils due to wearing of parts.

What I claim is:

1. For intermittently feeding perforated film, a tapered film feeding claw tooth having its lower face approximately horizontal adapted to be advanced into a film perforation and to fit, when advanced, the space between the foremost and rear margins of the perforation, and means for moving the tooth in a direction approximately normal to the plane of the film, into and out of engagement therewith and for advancing it laterally while so engaged.

2. The combination with a member having an aperture for exposing film, of means for guiding perforated film over said aperture, a toothed member, for engaging in the film perforations, mounted to rock about an axis substantially parallel to and at one side of the film's path and to slide bodily along that axis, a cam for reciprocating the latter member in the line of said axis, and a second cam arranged to rock the toothed member about said axis alternately into and out of engagement with the film.

3. The combination with a guide for film passing the exposure point, of a film engaging spring fork mounted to rock upon an axis parallel to and at one side of the film's path, a rotary shutter, a cam rigidly connected with the shutter rotating therewith and arranged for reciprocating said fork in the direction of the movement of the guided portion of the film, and a cam also rotating with the shutter similarly connected therewith and arranged to swing said fork into and out of film engaging position.

4. The combination with a plate having an aperture for exposing film and means for guiding a film strip over said aperture, of a shaft, parallel to the film's path, mounted at one side of said aperture in a fixed bearing, offset and provided at its free end with a film engaging spring fork, a rotary shutter, a cam rigidly connected with the shutter and arranged to reciprocate the shaft longitudinally, and a second cam similarly connected with the shutter and adapted to rock the fork periodically for moving it into and out of engagement with the film.

In testimony whereof I affix my signature in presence of two witnesses.

CHARLES FRANCIS JENKINS.

Witnesses:
J. R. WHITE,
JAMES L. CRAWFORD.